(12) United States Patent
Inoue et al.

(10) Patent No.: US 11,685,063 B2
(45) Date of Patent: Jun. 27, 2023

(54) SENSOR BRACKET AND ROBOT SYSTEM

(71) Applicant: FANUC CORPORATION, Yamanashi (JP)

(72) Inventors: Toshihiko Inoue, Yamanashi (JP); Tomoyuki Motokado, Yamanashi (JP); Hajime Suzuki, Yamanashi (JP); Kouichirou Hayashi, Yamanashi (JP); Shinichi Washizu, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 919 days.

(21) Appl. No.: 16/565,755

(22) Filed: Sep. 10, 2019

(65) Prior Publication Data

US 2020/0108511 A1 Apr. 9, 2020

(30) Foreign Application Priority Data

Oct. 5, 2018 (JP) ................. 2018-190414

(51) Int. Cl.
*B25J 19/02* (2006.01)
*G01D 11/24* (2006.01)

(52) U.S. Cl.
CPC ............ *B25J 19/02* (2013.01); *G01D 11/245* (2013.01); *F17C 2205/01* (2013.01); *F17C 2205/0107* (2013.01)

(58) Field of Classification Search
CPC .......... B25J 13/088; B25J 19/00; B25J 19/02; F17C 2205/01; F17C 2205/0107; G01D 11/245
See application file for complete search history.

(56) References Cited

U.S. PATENT DOCUMENTS

| | | | | |
|---|---|---|---|---|
| 6,147,469 | A * | 11/2000 | Uchida | G05B 19/4142 318/16 |
| 2014/0046486 | A1 | 2/2014 | Mimura et al. | |
| 2017/0106535 | A1 | 4/2017 | Yamaoka et al. | |
| 2018/0080849 | A1 | 3/2018 | Showcatally et al. | |

FOREIGN PATENT DOCUMENTS

| | | | | |
|---|---|---|---|---|
| EP | 1724072 | A1 * | 11/2006 | ............ B25J 13/088 |
| EP | 2 712 716 | A2 | 4/2014 | |
| JP | S49048627 | U | 4/1974 | |
| JP | S54162864 | U | 11/1979 | |
| JP | S58042402 | U | 3/1983 | |
| JP | H07067762 | A | 3/1995 | |

(Continued)

OTHER PUBLICATIONS

BASE Lab Tools, archived version of webpage of BASE Lab Tools Angle Brackets (Year: 2017).*

(Continued)

*Primary Examiner* — David L Singer
(74) *Attorney, Agent, or Firm* — Maier & Maier, PLLC (57) ABSTRACT

A sensor bracket is provided with frame members supporting an acceleration sensor, the frame members having circular arc members holding an outer periphery of a tool of a robot in a state in which circumferential-direction gaps are defined in at least one portion of the circular arc members in a circumferential direction, and a bolt thread-screwed into the frame members so as to reduce the circumferential-direction gaps.

13 Claims, 5 Drawing Sheets

(56) References Cited

FOREIGN PATENT DOCUMENTS

| | | | |
|---|---|---|---|
| JP | H08197250 A | | 8/1996 |
| JP | H08254206 A | | 10/1996 |
| JP | H09-070716 A | | 3/1997 |
| JP | H11123628 A | * | 5/1999 |
| JP | 2000249123 A | | 9/2000 |
| JP | 2005001055 A | * | 1/2005 |
| JP | 2009-202235 A | | 9/2009 |
| JP | 2009280992 A | | 12/2009 |
| JP | 2011251207 A | | 12/2011 |
| JP | 2013-106706 A | | 6/2013 |
| JP | 2013-123788 A | | 6/2013 |
| JP | 2014034075 A | | 2/2014 |
| JP | 2017-074647 A | | 4/2017 |
| KR | 20110047459 A | * | 5/2011 ............. B62D 65/04 |

OTHER PUBLICATIONS

BASE Lab Tools, Support Drawing for ABS006 6in Slotted Right Angle Bracket (Year: 2018).*
Japanese Office Action dated Nov. 4, 2020, in connection with corresponding JP Application No. 2018-190414 (9 pp., including machine-generated English translation).
Japanese Search Report dated Oct. 27, 2020, in connection with corresponding JP Application No. 2018-190414 (32 pp., including machine-generated English translation).

* cited by examiner

SENSOR BRACKET AND ROBOT SYSTEM

CROSS-REFERENCE TO RELATED APPLICATIONS

This application is based on and claims priority to Japanese Patent Application No. 2018-190414 filed on Oct. 5, 2018, the content of which is incorporated herein by reference in its entirety.

FIELD

The present invention relates to a sensor bracket and a robot system, and in particular to a sensor bracket for temporarily fixing an acceleration sensor to a tool of a robot.

BACKGROUND

Conventionally, for a robot having a moving part such as a tool, an acceleration sensor is used to detect a motion of the moving part (cf., Japanese Unexamined Patent Application, Publication No. 2017-074647; Japanese Unexamined Patent Application, Publication No. 2013-106706; Japanese Unexamined Patent Application, Publication No. 2009-202235; and Japanese Unexamined Patent Application, Publication No. H09-070716).

SUMMARY

One aspect of the present disclosure provides a sensor bracket provided with: a frame member supporting an acceleration sensor, and having a circular arc member holding an outer periphery of a tool of a robot in a state in which a circumferential-direction gap is defined in at least one portion of the circular arc member in a circumferential direction; and a bolt thread-screwed into the frame member so as to reduce the circumferential-direction gap.

Another aspect of the present disclosure provides a robot system provided with: a robot; a tool connected to a tip end of a robot arm of the robot; the sensor bracket according to one of those described above, the sensor bracket being attached to the tool; and an acceleration sensor supported by the sensor bracket, wherein an arm member at a most distal end of the robot arm has a hole that penetrates the arm member along a rotational axis line of the arm member, and a control cable of the acceleration sensor is provided via the hole of the arm member at the most distal end.

DETAILED DESCRIPTION

Hereinafter, a sensor bracket 1 and a robot system 10 according to one embodiment of the present invention will be described with reference to the drawings.

Figure 1:
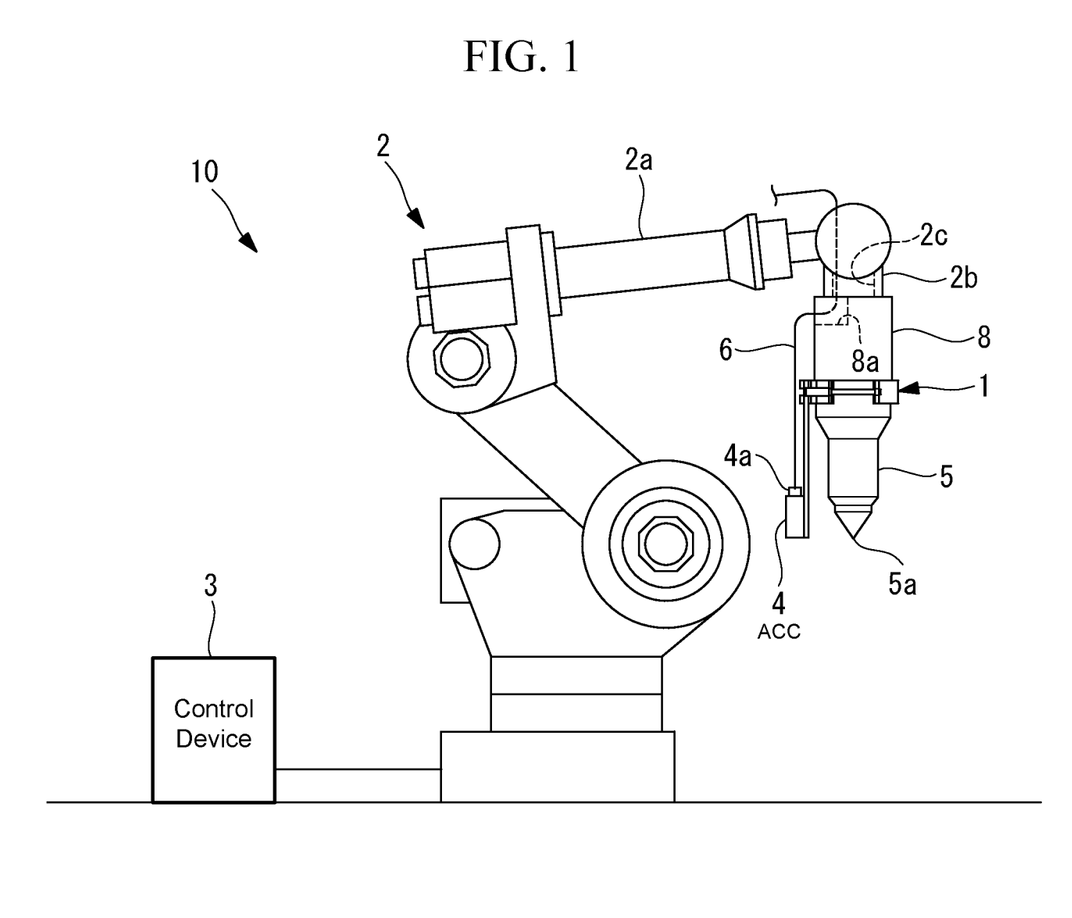
FIG. 1 is a schematic view illustrating an entire configuration of a robot system according to one embodiment of the present invention.

As shown in FIG. 1, the robot system 10 according to this embodiment includes: a robot 2 having a tool 5; a control device 3 that controls the robot 2; the sensor bracket 1 removable from the tool 5; and an acceleration sensor 4 fixed to the sensor bracket 1.

The robot 2 includes a robot arm 2a having joints, and the tool 5 is connected to a tip end of the robot arm 2a. As one example, the robot 2 is a 6-axis articulated robot. The tool 5 is for machining such as laser cutting, laser welding, arc welding, sealing, painting, or deburring. In such machining, it is required to accurately control a trajectory of small-diameter a tip end 5a of the tool 5. The tool 5 has a circular cross-sectional shape substantially across a whole length.

The control device 3 is connected to the robot 2 and the tool 5. The control device 3 includes a control unit (not shown) having a processor or the like, and a storage unit (not shown) having a non-volatile storage, ROM, RAM, or the like. The storage unit stores a machining program. The control unit transmits control commands for driving servo motors of the joints of the robot arm 2a and the tool 5, based on the machining program, to the servo motors and the tool 5. With this, the robot arm 2a and the tool 5 are operated based on the machining program, and a machining object is subjected to machining by the tip end 5a of the tool 5 that moves along a predetermined trajectory.

Further, the control device 3 is connected to the acceleration sensor 4 via a control cable 6. The control device 3 carries out machine learning of the machining program, based on acceleration received from the acceleration sensor 4.

Figure 2:
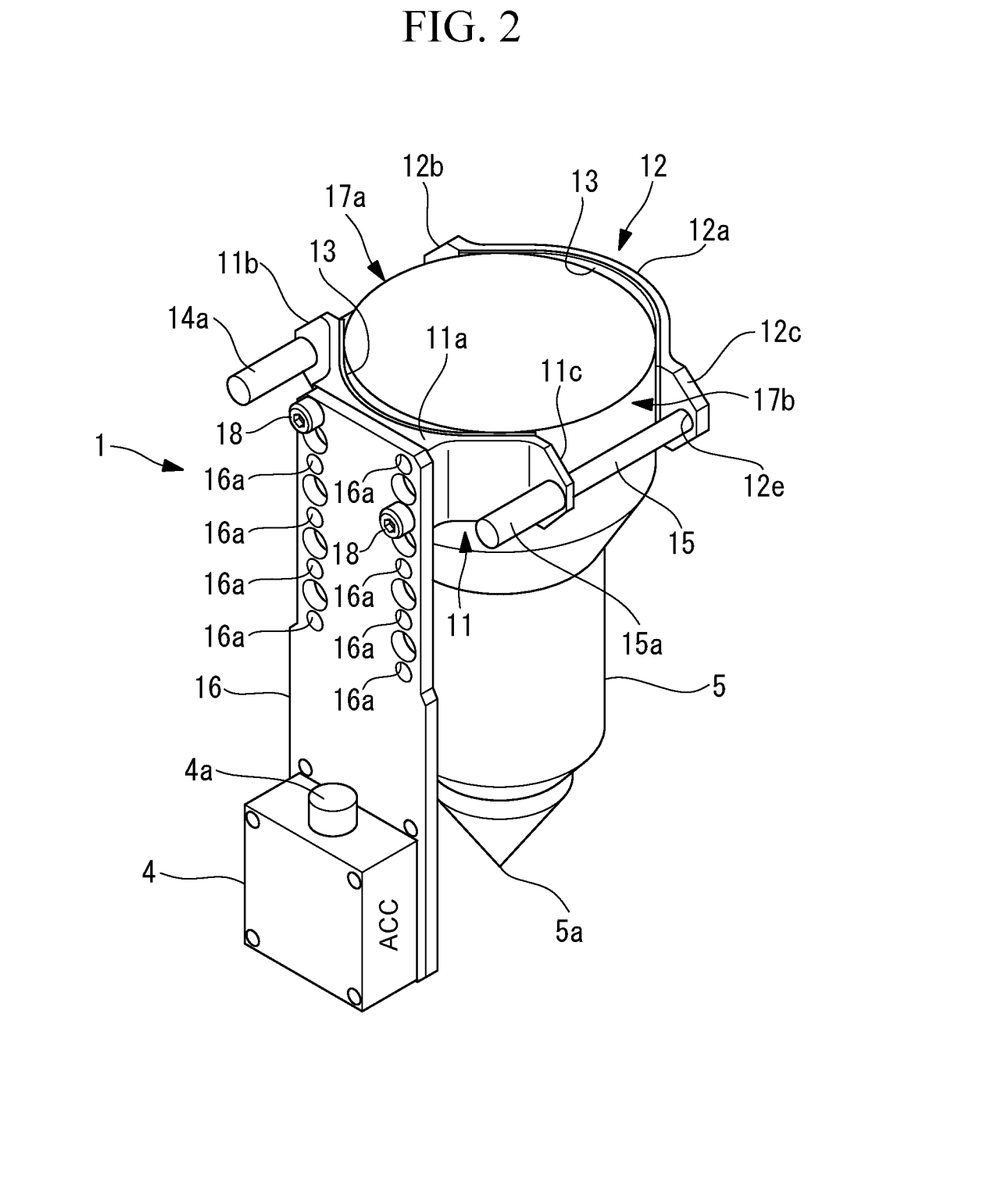
FIG. 2 is an entire perspective view of a sensor bracket according to the one embodiment of the present invention.
Figure 3:
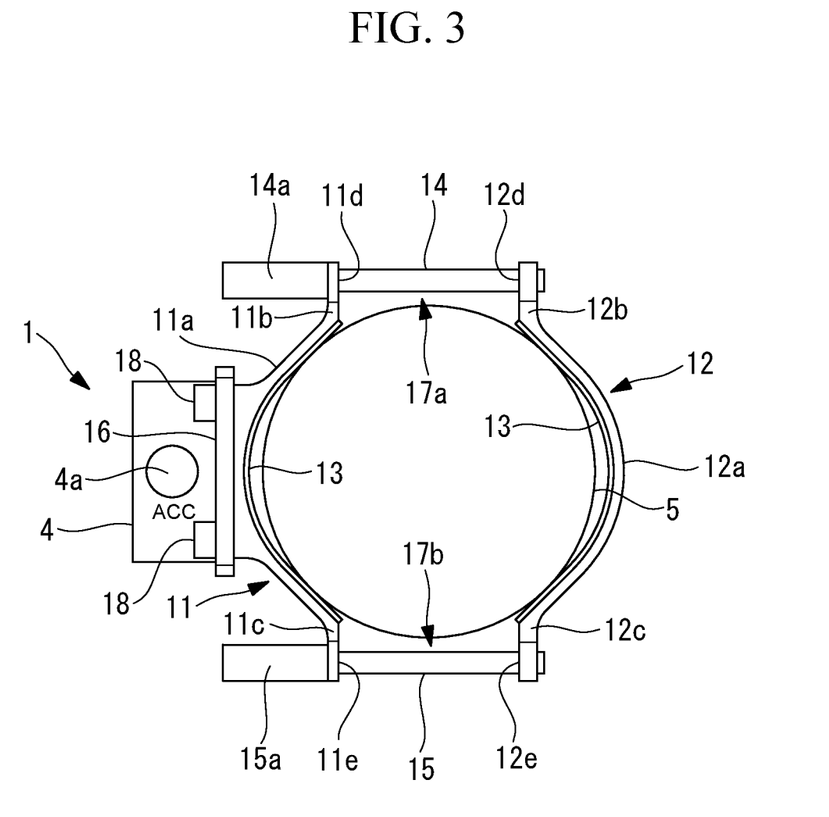
FIG. 3 is a plan view of the sensor bracket shown in FIG. 2, viewed from a base end side of a tool.
Figure 4:
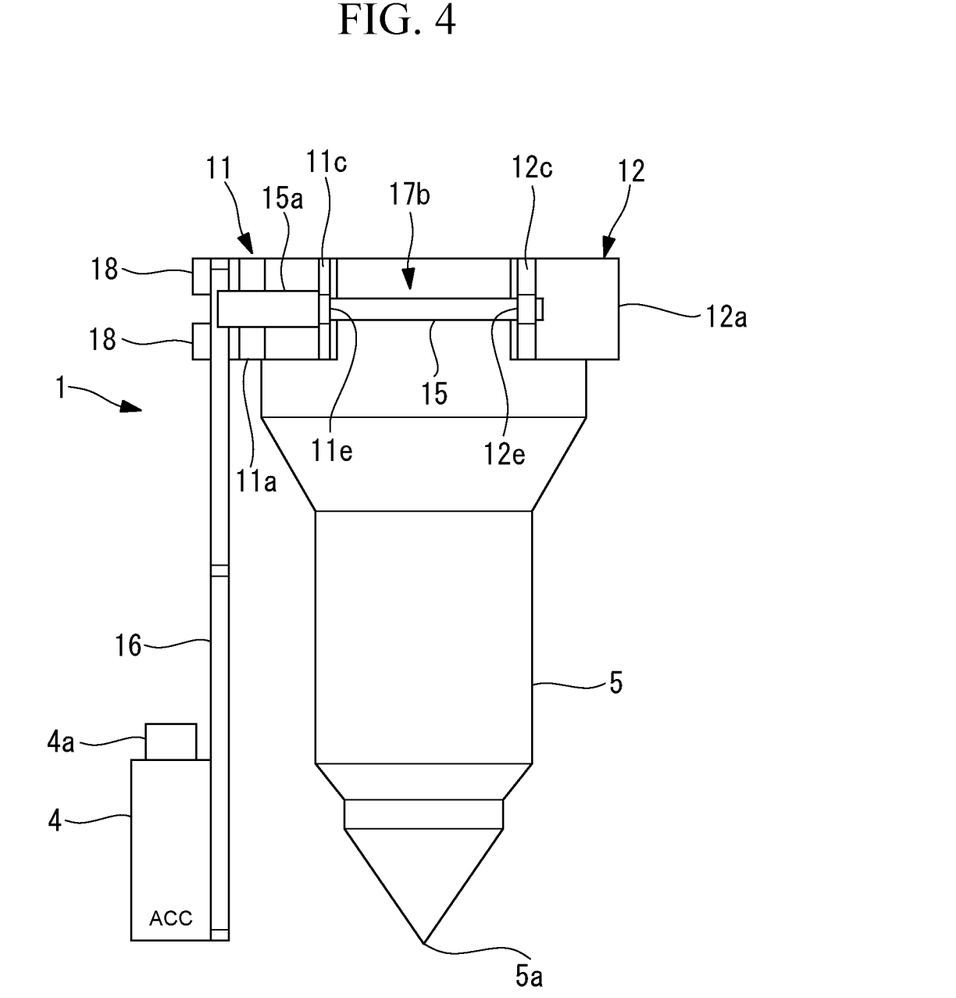
FIG. 4 is a side view of the sensor bracket shown in FIG. 2.

As shown in FIG. 2 through FIG. 4, the sensor bracket 1 includes: a pair of frame members 11 and 12 provided around an outer periphery of the tool 5; elastic members 13 provided respectively on inner surfaces of the frame members 11 and 12; bolts 14 and 15 for fastening end portions of the frame members 11 and 12; and a support member 16 coupled to the frame member 11.

Each of the frame members 11 and 12 is a thin band-plate member that curves substantially in an arc-like shape as a whole, and made of a rigid material such as metal. The first frame member 11 includes a circular arc member 11a that curves in one direction substantially in an arc-like shape, and end portions 11b and 11c provided at both side-ends of the circular arc member 11a. The end portions 11b and 11c project outwardly along a straight line that passes the side-ends of the circular arc member 11a. Similarly, the second frame member 12 includes a circular arc member 12a that curves in one direction substantially in an arc-like shape, and end portions 12b and 12c provided at both side-ends of the circular arc member 12a. The end portions 12b and 12c project outwardly along a straight line that passes the side-ends of the circular arc member 12a.

As shown in FIG. 3, the pair of frame members 11 and 12 are provided with their inner surfaces facing the tool 5 on both sides of the tool 5 in a radial direction, so as to sandwich the tool 5 in the radial direction, and holding the outer periphery of the tool 5. In the state shown in FIG. 3, the pair of frame members 11 and 12 form a substantial partial circular ring having two circumferential-direction gaps 17a and 17b in a circumferential direction. In this state, the one end portion 11b of the first frame member 11 and the one end portion 12b of the second frame member 12 face each other with the one circumferential-direction gap 17a provided therebetween. Further, the other end portion 11c of the first frame member 11 and the other end portion 12c of the second frame member 12 face each other with the other circumferential-direction gap 17b provided therebetween. It is preferable that the circumferential-direction gaps 17a and 17b are provided at positions that face each other in a radial direction of the tool 5.

The end portions 11b and 12b respectively include holes 11d and 12d through which a first bolt 14 is inserted, and the end portion 11c and 12c respectively include holes 11e and 12e through which a second bolt 15 is inserted. The holes 11d and 11e of the first frame member 11 are through holes having an inner diameter larger than a nominal diameter of the bolts 14 and 15. The holes 12d and 12e of the second frame member 12 are bolt holes having an internal thread on their inner surfaces with which the bolts 14 and 15 are screwed together. The bolts 14 and 15 are knurled bolts having knurling on surfaces of their head portions 14a and 15a. An operator is able to easily rotate the head portions 14a and 15a held by the operator's hand, and is able to easily screw and unscrew the bolts 14 and 15 into the bolt holes 12d and 12e by hand.

The elastic members 13 are elastically compressible sheet-shaped members. It is preferable that at least a partial surface of each of the elastic members 13 that is brought into contact with the outer periphery of the tool 5 has a high friction coefficient, so as to serve as a slip resistance against the outer periphery of the tool 5. It is preferable that the elastic members 13 have rubber-type elasticity, and one example of the elastic member 13 is a rubber sheet. The elastic members 13 respectively cover substantially the entire inner surfaces of the circular arc members 11a and 12a, and are fixed to the inner surfaces of the corresponding circular arc members 11a and 12a.

As long as direct contact between an outer surface of the tool 5 and the inner surfaces of the circular arc members 11a and 12a is prevented by the elastic members 13, the elastic members 13 may cover the inner surface of the circular arc members 11a and 12a only partially. For example, more than one elastic member 13 may be provided with a space between each other entirely over the inner surfaces of the circular arc members 11a and 12a.

Further, non-slip members separate from the elastic members 13 may be fixed to the inner surfaces of the circular arc members 11a and 12a.

The support member 16 is a flat and thin band-plate member, and in a substantial rectangular shape with a longitudinal axis. The support member 16 extends from the first frame member 11 in a direction vertical to a plane defined by the first frame member 11 (a plane parallel to a plane of paper in FIG. 3). In a state in which the frame members 11 and 12 are fixed to the tool 5, the support member 16 extends in a longitudinal direction of the tool 5. One end portion of the support member 16 is fixed to an outer surface of the first frame member 11 by a pair of threads 18. The other end portion of the support member 16 includes an area for sensor attachment to which the acceleration sensor 4 is fixed.

Figure 5:
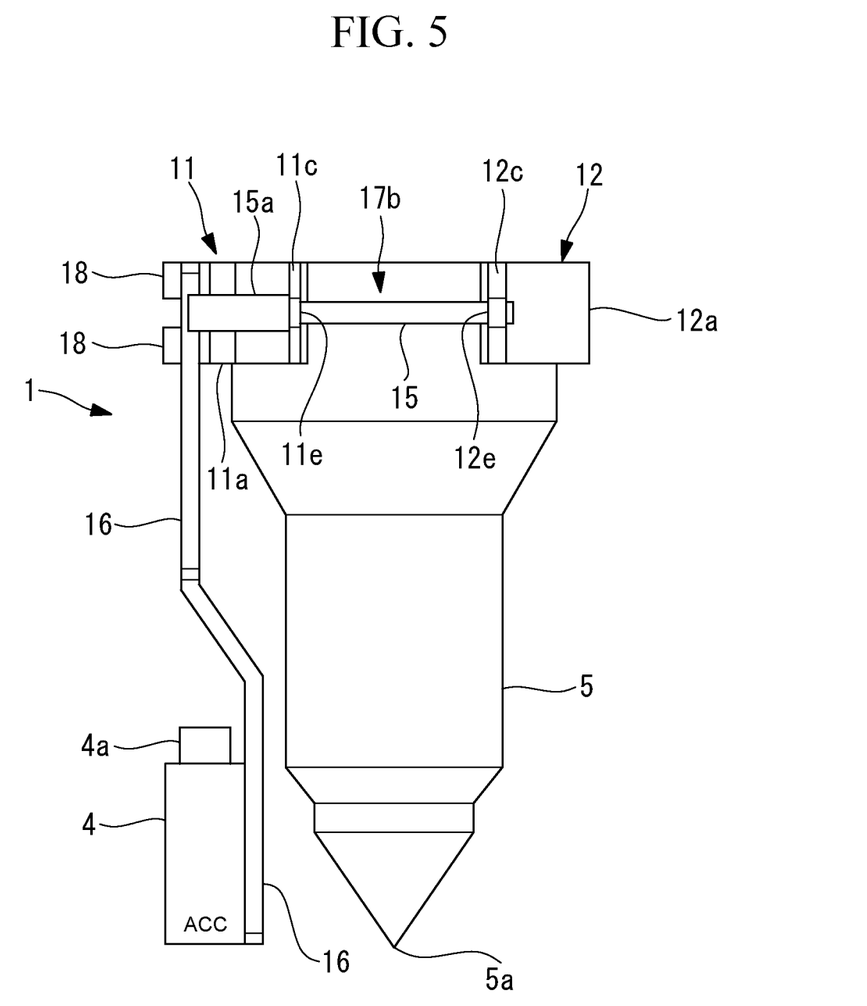
FIG. 5 is a side view of a modified example of the sensor bracket shown in FIG. 2.

The tool 5 for machining are often configured such that its tip end portion has an outer diameter smaller than that of a base end portion fixed to the tip end of the robot arm 2a. Therefore, the tip end portion of the support member 16 may be displaced inwardly from the base end portion of the support member 16 as shown in FIG. 5, so that the tip end portion of the support member 16 is provided closer to the longitudinal axis of the tool 5 than a base end portion of the support member 16.

As one example, the acceleration sensor 4 is a 3-axis acceleration sensor or a 6-axis acceleration sensor. The acceleration sensor 4 is fixed to the area for sensor attachment of the support member 16, using arbitrary fixation means such as threading and magnets. To a connector 4a of the acceleration sensor 4, the control cable 6 is connected. The control cable 6 is not shown in FIG. 2 through FIG. 5.

In place of the wired acceleration sensor 4, a wireless acceleration sensor 4 may be used. In the case in which the wireless acceleration sensor 4 is used, providing the control cable 6 is not necessary.

As shown in FIG. 2, the one end portion of the support member 16 is provided with holes 16a that are formed in two rows with a space between each other in a width direction of the support member 16. Each of the holes 16a penetrates the support member 16 in a through-thickness direction. In each row, the plurality of holes 16a are defined at positions with a space between each other in a longitudinal direction of the support member 16. Two thread holes (not shown) are defined in the outer surface of the first frame member 11. By selecting one of the holes 16a in each row, and screwing the threads 18 into two thread holes of the first frame member 11 via and the selected two holes 16a, the support member 16 may be fixed to the first frame member 11. Further, by changing positions of the selected holes 16a in each row, it is possible to change coupling positions of the support member 16 to the first frame member 11 in a longitudinal direction, and a coupling angle of the support member 16 with respect to the first frame member 11.

Next, effects of the sensor bracket 1 and the robot system 10 thus configured will be described.

The sensor bracket 1 is fixed to the tool 5 in machine learning after the trajectory of the tip end 5a of the tool 5 is instructed by the machining program. The operator positions the pair of frame members 11 and 12 on the both end sides of the tool 5 in a radial direction, inserts the first bolt 14 into the holes 11d and 12d, inserts the second bolt 15 into the holes 11e and 12e, and screws the bolts 14 and 15 tightly into the bolt holes 12d and 12e, respectively.

In a process of screwing the bolts 14 and 15, the circumferential-direction gap 17a between the end portions 11b and 12b and the circumferential-direction gap 17b between the end portion 11c and 12c gradually decrease, a distance between the pair of circular arc members 11a and 12a also gradually decreases, and finally the inner surfaces of the circular arc members 11a and 12a are closely attached to the outer periphery of the tool 5 via the elastic members 13. With this, the frame members 11 and 12 is fixed to the outer periphery of the tool 5, and the acceleration sensor 4 supported by the first frame member 11 via the support member 16 is positioned near the tip end 5a of the tool 5.

In FIG. 1 through FIG. 5, the frame members 11 and 12 are fixed to the base end portion of the tool 5. However, the frame members 11 and 12 may be fixed to the tool 5 at a position closer to the tip end 5a.

Then, as required, the operator adjusts the coupling position and the coupling angle of the support member 16 to the first frame member 11 so that the acceleration sensor 4 may be positioned closer to the tip end 5a of the tool 5.

Next, machine learning is performed by the robot 2. In machine learning, by operating the robot 2 according to the machining program, the control device 3 moves the tip end 5a of the tool 5 along the instructed trajectory. Due to vibration, overshoot, and the like of the tool 5, a difference could occur between the instructed trajectory and an actual trajectory of the tip end 5a. While the tip end 5a moves along the trajectory, the acceleration sensor 4 detects the acceleration over time, and transmits a result of the detection to the control device 3. The control device 3 calculates the actual trajectory of the tip end 5a from the acceleration detected by the acceleration sensor 4. The control device 3 repeats correction of control commands to the servo motors of the robot arm 2a and calculation of the actual trajectory of the tip end 5a, and learns control commands to the servo motors with which the difference between the instructed trajectory and the actual trajectory is minimized.

After the machine learning, the operator removes the bolts 14 and 15 from the pair of frame members 11 and 12, and the sensor bracket 1 from the tool 5. Thereafter, the machining program is executed, and the robot arm 2a operates according to control commands that have been learned. In the machining program after the machine learning, the operation of the robot arm 2a is controlled so that vibration of the tip end 5a of the tool 5 is suppressed, and as a result, the trajectory of the tip end 5a of the tool 5 matches the instructed trajectory. With this, it is possible to perform machining to the machining object accurately.

As described above, according to this embodiment, the pair of frame members 11 and 12 may be easily fixed to the tool 5 by mechanically fastening of the bolts 14 and 15. Therefore, the acceleration sensor 4 may be fixed to the tool 5 temporarily and easily when necessary, and the acceleration sensor 4 may be removed from the tool 5 easily when unnecessary. In particular, using knurled bolts as the bolts 14 and 15, the operator is able to attach and remove the sensor bracket 1 to and from the tool 5 more easily without using a tool.

Further, as the frame members 11 and 12 are fixed to the tool 5 itself, a length of the support member 16 of a cantilever-type may be reduced as compared to a case in which the sensor bracket 1 is fixed to the tip end portion of the robot arm 2a. With this, it is possible to realize high rigidity of the support member 16, and it is possible to suppress displacement of the tip end portion of the support member 16 due to vibration and flexure of the support member 16. Specifically, it is possible to maintain relative positions and relative orientations of the acceleration sensor 4 and the tip end 5a of the tool 5 during movement of the robot arm 2a, and to accurately detect the acceleration of the tip end 5a by the acceleration sensor 4.

Moreover, the tool 5 for machining includes tools with different outer diameters. According to this embodiment, an interval between the pair of circular arc members 11a and 12a may be changed based on an amount of threading of the bolts 14 and 15. Therefore, it is possible to fix the pair of frame members 11 and 12 to the tools 5 with different outer diameters. Specifically, it is not necessary to prepare the sensor bracket 1 for each of the tools 5, and the sensor bracket 1 that is commonly used for machine learning of various types of the tool 5 may be used. As described above, it is possible to provide the sensor bracket 1 that is highly versatile.

Furthermore, by compression of the elastic members 13 respectively provided between the outer periphery of the tool 5 and the inner surfaces of the circular arc members 11a and 12a, the inner surfaces of the circular arc members 11a and 12a are more tightly attached to the outer periphery of the tool 5. With this, it is possible to fix the frame members 11 and 12 more stably to the tool 5. Further, when the elastic members (non-slip members) 13 are made of a material having a high friction coefficient such as rubber, slipping of the frame members 11 and 12 against the outer surface of the tool 5 is prevented by the elastic members 13. With this, it is possible to fix the frame members 11 and 12 further stably to the tool 5. Moreover, the elastic members 13 protects the outer periphery of the tool 5 from direct contact with the frame members 11 and 12, and it is possible to prevent the outer periphery of the tool 5 from being damaged.

It should be noted that applications of the sensor bracket 1 and the acceleration sensor 4 according to this embodiment are not limited to machine learning, and may include other usage. For example, during machining of a machining object by the tip end 5a of the tool 5, the acceleration sensor 4 may detect the acceleration of the tip end 5a of the tool 5, and the control device 3 may control the robot arm 2a based on the detected acceleration.

Further, according to this embodiment, the tool 5 is in a shape with a circular cross section, but the shape of the tool 5 to which the sensor bracket 1 is applied is not limited to such an example. For example, the sensor bracket 1 may be fixed to an outer surface of the tool 5 in an arbitrary prism shape with a polygonal cross section.

In this embodiment, it is preferable that the support member 16 includes a belt-like fixing member for fixing the control cable 6 to the support member 16.

When the control cable 6 is freely movable with respect to the acceleration sensor 4, the control cable 6 may swing or be pulled due to the movement of the robot arm 2a, and vibration and tensile forces of the control cable 6 may be transmitted to the acceleration sensor 4 via the connector 4a. Noises due to such vibration and tensile forces of the control cable 6 can be included in the acceleration detected by the acceleration sensor 4. By fixing the control cable 6 to the support member 16 using a fixing member, occurrence of noises due to the control cable 6 may be prevented.

In this embodiment, the control cable 6 of the acceleration sensor 4 may be provided within an arm member 2b at the most distal end of the robot arm 2a.

When a robot whose joint at the most distal end of the robot arm 2a is a rotary joint like a case of a 6-axis articulated robot, the arm member 2b at the most distal end has a hole 2c that penetrates through the arm member 2b along a rotational axis line of the arm member 2b as shown in FIG. 1. The control cable 6 is inserted into the hole 2c from a tip-end side of the arm member 2b.

By containing the control cable 6 within the arm member 2b, it is possible to prevent the moving robot arm 2a from being interfered by the control cable 6.

An insertion opening 8a that communicates with the hole 2c of the arm member 2b may be defined in an outer periphery of a tool attachment member 8 at a base end portion, so that the control cable 6 may be easily inserted into the arm member 2b at the most distal end. The tool attachment member 8 is a member for connecting the tool 5 to a tip end of the robot arm 2a, and positioned between the arm member 2b at the most distal end and the tool 5.

A conduit (not shown) for containing various cables is provided within or outside the robot arm 2a. The control cable 6 pulled from the base end of the arm member 2b at the most distal end is connected to the control device 3 via an interior or exterior of the conduit.

According to this embodiment, the pair of frame members 11 and 12 are in a substantially circular arc forming a partial circular ring. However, the shape of the frame members 11 and 12 is not limited to this example. For example, the circular arc members 11a and 12a of the frame members 11 and 12 may be in a substantially V shape.

According to this embodiment, the sensor bracket 1 includes the pair of frame members 11 and 12. However, instead, the sensor bracket 1 may include a single frame member in a substantially C shape having only one circumferential-direction gap defined in a circumferential direction. In the case of the single frame member, by adjusting a distance between a pair of end portions with the circumferential-direction gap therebetween, a distance between inner surfaces of the frame member may be changed according to the outer diameter of the tool 5.

According to this embodiment, the bolts 14 and 15 are knurled bolts. However, instead, the bolts 14 and 15 may be bolts of a different type that can be threaded into or out manually or with a tool.

In this embodiment, the frame member 11 supports the acceleration sensor 4 via the support member 16. However, instead, the frame member 11 may directly support the acceleration sensor 4. Specifically, the sensor bracket 1 may not include the support member 16, and an area for sensor attachment for fixation of the acceleration sensor 4 may be reserved in the frame member 11 or 12.

According to the configuration in which the support member 16 is not included as described above, it is also possible to provide the acceleration sensor 4 near the tip end 5a of the tool 5 by fixing the frame members 11 and 12 to the tool 5 itself.

From the above-described embodiments, the following aspects of the present disclosure are derived.

One aspect of the present invention provides a sensor bracket provided with: a frame member supporting an acceleration sensor, and having a circular arc member holding an outer periphery of a tool of a robot in a state in which a circumferential-direction gap is defined in at least one portion of the circular arc member in a circumferential direction; and a bolt thread-screwed into the frame member so as to reduce the circumferential-direction gap.

According to this aspect, the frame member is provided around the outer periphery of the tool so that the circular arc member holds the outer periphery of the tool, and the bolt is thread-screwed into the frame member so as to reduce the circumferential-direction gap, thereby the inner surface of the circular arc member is closely attached to the outer periphery of the tool. With this, it is possible to fix the frame member to the outer periphery of the tool by friction between the inner surface in a circular arc and the outer periphery of the tool. When the acceleration sensor is not necessary, the frame member may be easily removed from the tool by unscrewing the bolt.

As described above, the frame member is mechanically fixed to the tool by screwing of the bolt. Therefore, it is possible to temporarily and easily fix the frame member to the tool. Further, by fixing the frame member to the tool itself, the acceleration sensor supported by the frame member may be stably fixed to a portion near the tip end of the tool. Moreover, providing the circumferential-direction gap makes the inner diameter of the circular arc member be changeable according to the outer diameter of the tool. Therefore, it is possible to fix the frame member to tools with different outer diameters, and to provide a versatile sensor bracket.

In this aspect, the frame member may include a first frame member and a second frame member, and the bolt may include a first bolt and a second bolt, the first bolt reduces the circumferential-direction gap between one end portion of the first frame member and one end portion of the second frame member, and the second bolt reduces the circumferential-direction gap between the other end portion of the first frame member and the other end portion of the second frame member.

According to this configuration, the first and the second frame member may be fitted around the outer periphery of the tool in a radial direction. With this, it is possible to position the frame member on the outer periphery of the tool more easily.

In this aspect, a support member having one end portion coupled to the circular arc member of the frame member may further be provided, the support member extending in a longitudinal direction of the tool, wherein the acceleration sensor may be fixed to the other end portion of the support member.

According to this configuration, when a long tool is used, it is possible to position the acceleration sensor at a portion near the tip end of the tool while the frame member is fixed to the outer periphery of the tool at a position apart from the tip end of the tool.

In this aspect, a coupling position of the support member to the circular arc member may be changeable in a longitudinal direction of the support member.

According to this configuration, it is possible to position the acceleration sensor closer to the tip end of the tool by adjusting the coupling position between the support member and the circular arc member.

In this aspect, a coupling angle of the support member to the circular arc member may be changeable.

According to this configuration, it is possible to position the acceleration sensor closer to the tip end of the tool by adjusting the coupling angle between the support member and the circular arc member.

In this aspect, an elastic member provided on an inner surface of the circular arc member may further be provided, the elastic member being elastically compressible.

According to this configuration, the inner surface of the circular arc member is more tightly attached to the outer periphery of the tool by compressing the elastic member. With this, it is possible to fix the frame member to the tool more stably.

In this aspect, a non-slip member provided on an inner surface of the circular arc member may further be provided.

According to this configuration, the non-slip member prevents the circular arc member from slipping against the outer periphery of the tool. With this, it is possible to fix the frame member to the tool more stably.

In this aspect, the bolt may be a knurled bolt.

According to this configuration, an operator is able to screw and unscrew the knurled bolt manually without using any tool. Further, it is possible to ensure an appropriate fastening force by optimizing a diameter of a head portion of the knurled bolt.

Another aspect of the present invention provides a robot system provided with: a robot; a tool connected to a tip end of a robot arm of the robot; the sensor bracket according to one of those described above, the sensor bracket being attached to the tool; and an acceleration sensor supported by the sensor bracket, wherein an arm member at a most distal end of the robot arm has a hole that penetrates the arm member along a rotational axis line of the arm member, and a control cable of the acceleration sensor is provided via the hole of the arm member at the most distal end.

According to the aforementioned aspects, it is possible to achieve an advantageous effect of providing a versatile sensor bracket capable of fixing an acceleration sensor to a portion near a tip end of a tool temporarily and easily.

The invention claimed is:

1. A sensor bracket comprising:
    a frame member supporting an acceleration sensor, and having a circular arc member holding an outer periphery of a tool, which has a first end and a second end in a longitudinal direction of the tool, supported by a robot in a state in which a circumferential-direction gap is defined in at least one portion of the circular arc member in a circumferential direction;

a bolt thread-screwed into the frame member to reduce the circumferential-direction gap; and a support member which is long in the longitudinal direction of the tool, the support member having a first end in the longitudinal direction coupled to the circular arc member of the frame member, the support member extending in the longitudinal direction of the tool, wherein the acceleration sensor is fixed to a second end in the longitudinal direction of the support member.

2. The sensor bracket according to claim 1, wherein the frame member comprises a first frame member and a second frame member, the bolt comprises a first bolt and a second bolt, the first bolt reduces the circumferential-direction gap between a first end of the first frame member and a first end of the second frame member, and the second bolt reduces the circumferential-direction gap between a second end of the first frame member and a second end of the second frame member.

3. The sensor bracket according to claim 1, wherein a coupling position of the support member to the circular arc member is changeable in a longitudinal direction of the support member.

4. The sensor bracket according to claim 1, wherein a coupling angle of the support member to the circular arc member is changeable.

5. The sensor bracket according to claim 1, further comprising:
an elastic member provided on an inner surface of the circular arc member, the elastic member being elastically compressible.

6. The sensor bracket according to claim 1, further comprising:
a non-slip member provided on an inner surface of the circular arc member.

7. The sensor bracket according to claim 1, wherein the bolt is a knurled bolt.

8. The sensor bracket according to claim 1, wherein the circular arc member holds the outer periphery of the tool at a side of the first end of the tool, wherein the first end is held by the robot.

9. The sensor bracket according to claim 8, wherein the second end of the support member is closer to the second end of the tool than the first end of the support member.

10. A robot system comprising:
a robot;
a tool supported by a tip end of a robot arm of the robot, the tool having a first end and a second end in a longitudinal direction of the tool;
a sensor bracket attached to the tool, wherein the sensor bracket comprises:
a frame member having a circular arc member holding an outer periphery of the tool in a state in which a circumferential-direction gap is defined in at least one portion of the circular arc member in a circumferential direction; and
a bolt thread-screwed into the frame member to reduce the circumferential-direction gap, wherein the robot system further comprises:
an acceleration sensor supported by the sensor bracket; and
a support member which is long in the longitudinal direction of the tool, the support member having a first end in the longitudinal direction coupled to the circular arc member of the frame member, the support member extending in the longitudinal direction of the tool, wherein the acceleration sensor is fixed to a second end in the longitudinal direction of the support member.

11. The robot system according to claim 10, wherein an arm member at a most distal end of the robot arm has a hole that penetrates the arm member along a rotational axis line of the arm member, and a control cable of the acceleration sensor is provided via the hole of the arm member at the most distal end.

12. The robot system according to claim 10, wherein the circular arc member holds the outer periphery of the tool at a side of the first end of the tool, wherein the first end is held by the robot.

13. The robot system according to claim 12, wherein the second end of the support member is closer to the second end of the tool than the first end of the support member.

* * * * *